(12) United States Patent
Richardson

(10) Patent No.: US 9,222,473 B2
(45) Date of Patent: Dec. 29, 2015

(54) PASSIVE PRESSURE REGULATION MECHANISM

(71) Applicant: Aperia Technologies, South San Francisco, CA (US)

(72) Inventor: Brandon Richardson, San Francisco, CA (US)

(73) Assignee: Aperia Technologies, Inc., South San Francisco, CA (US)

( * ) Notice: Subject to any disclaimer, the term of this patent is extended or adjusted under 35 U.S.C. 154(b) by 256 days.

(21) Appl. No.: 13/797,846

(22) Filed: Mar. 12, 2013

(65) Prior Publication Data

US 2014/0093402 A1    Apr. 3, 2014

Related U.S. Application Data (60) Provisional application No. 61/613,406, filed on Mar. 20, 2012, provisional application No. 61/637,206, filed on Apr. 23, 2012, provisional application No. 61/672,223, filed on Jul. 16, 2012.

(51) Int. Cl.

| | |
|---|---|
| *F04B 49/08* | (2006.01) |
| *F16H 25/08* | (2006.01) |
| *F04B 9/04* | (2006.01) |

(Continued)

(52) U.S. Cl.
CPC ............... *F04B 49/08* (2013.01); *B60C 23/00* (2013.01); *B60C 23/001* (2013.01); *B60C 23/003* (2013.01); *B60C 23/12* (2013.01); *B60S 5/043* (2013.01); *F04B 9/04* (2013.01); *F04B 9/042* (2013.01); *F04B 17/00* (2013.01); *F04C 25/00* (2013.01); *F16F 15/1485* (2013.01); *F16H 25/08* (2013.01); *F17D 3/00* (2013.01); *H02K 7/18* (2013.01); *Y10T 74/2107* (2015.01); *Y10T 74/2128* (2015.01); *Y10T 137/86002* (2015.04)

(58) Field of Classification Search
CPC .... B60C 23/00; B60C 23/001; B60C 23/003; B60C 23/12; B60S 5/043; F04B 17/00; F04B 49/08; F04B 9/04; F04B 9/042; F04C 25/00; F16F 15/1485; F16H 25/08; Y10T 74/2107; Y10T 74/2128
See application file for complete search history.

(56) References Cited

U.S. PATENT DOCUMENTS 1,358,524 A * 11/1920 Cooper .......................... 152/421
1,448,248 A *  3/1923 Anthony ....................... 152/421

(Continued)

FOREIGN PATENT DOCUMENTS

| CN | 101415946 A | 4/2009 |
|---|---|---|
| WO | 2009034321 A | 3/2009 |

(Continued)

*Primary Examiner* — Peter J Bertheaud
*Assistant Examiner* — Dominick L Plakkoottam
(74) *Attorney, Agent, or Firm* — Jeffrey Schox; Diana Lin (57) ABSTRACT

A pump system including a drive mechanism that provides a pumping force, a primary pump including a first pump cavity, an actuating element in reciprocal relation with the first pump cavity, and an outlet fluidly connected to a reservoir, a force translator that facilitates pump force transfer from the drive mechanism to the actuating element, a pressure regulation mechanism including a reciprocating pump that includes a pump chamber including an inlet manifold fluidly connected to the reservoir, a valve located within the inlet manifold, and a reciprocating element in reciprocal relation with the pump chamber. The pressure regulation mechanism preferably passively ceases force transfer from the drive mechanism to the primary pump based on the pressure of the reservoir.

28 Claims, 7 Drawing Sheets

(51) Int. Cl.
*F04C 25/00* (2006.01)
*B60C 23/00* (2006.01)
*B60C 23/12* (2006.01)
*B60S 5/04* (2006.01)
*F04B 17/00* (2006.01)
*F16F 15/14* (2006.01)
*F17D 3/00* (2006.01)
*H02K 7/18* (2006.01)

(56) References Cited

U.S. PATENT DOCUMENTS

| | | | |
|---|---|---|---|
| 2,211,935 A | 8/1940 | Parker | |
| 2,899,907 A | 8/1959 | Becher | |
| 2,962,119 A | 11/1960 | White | |
| 3,012,820 A | 12/1961 | King | |
| 3,047,339 A | 7/1962 | Hamer | |
| 3,152,553 A | 10/1964 | Sverker | |
| 3,175,507 A | 3/1965 | Sverker | |
| 3,249,059 A | 5/1966 | Renn | |
| 3,400,074 A | 9/1968 | Grenci | |
| 3,452,801 A * | 7/1969 | Fletcher et al. | 152/419 |
| 3,511,294 A | 5/1970 | Bepristis et al. | |
| 3,532,449 A | 10/1970 | Garton | |
| 3,730,215 A | 5/1973 | Conery et al. | |
| 3,886,974 A | 6/1975 | Bjorklund | |
| 3,981,633 A | 9/1976 | Wall | |
| 4,018,579 A | 4/1977 | Hofmann | |
| 4,030,300 A | 6/1977 | Thompson | |
| 4,095,923 A | 6/1978 | Cullis | |
| 4,121,472 A | 10/1978 | Vural et al. | |
| 4,157,530 A | 6/1979 | Merz | |
| 4,256,971 A | 3/1981 | Griffith | |
| 4,291,235 A | 9/1981 | Bergey, Jr. et al. | |
| 4,370,894 A | 2/1983 | Sturesson | |
| 4,460,006 A | 7/1984 | Kolze | |
| 4,536,668 A | 8/1985 | Boyer | |
| 4,606,710 A | 8/1986 | Maguire | |
| 4,637,152 A | 1/1987 | Roy | |
| 4,651,792 A * | 3/1987 | Taylor | 152/415 |
| 4,744,399 A | 5/1988 | Magnuson et al. | |
| 4,768,542 A | 9/1988 | Morris | |
| 4,807,487 A | 2/1989 | Seidl | |
| 4,819,593 A | 4/1989 | Bruener et al. | |
| 4,852,528 A | 8/1989 | Richeson et al. | |
| 4,893,459 A | 1/1990 | Orlando | |
| 4,895,199 A | 1/1990 | Magnuson et al. | |
| 4,910,148 A | 3/1990 | Sorensen et al. | |
| 4,922,984 A | 5/1990 | Dosjoub et al. | |
| 5,018,797 A | 5/1991 | Takata | |
| 5,052,456 A | 10/1991 | Dosjoub | |
| 5,173,038 A | 12/1992 | Hopfensperger et al. | |
| 5,201,968 A | 4/1993 | Renier | |
| 5,293,919 A | 3/1994 | Olney et al. | |
| 5,325,902 A | 7/1994 | Loewe et al. | |
| 5,342,177 A | 8/1994 | Cheng | |
| 5,370,711 A | 12/1994 | Audit et al. | |
| 5,375,984 A | 12/1994 | Wehling | |
| 5,388,470 A | 2/1995 | Marsh, Jr. | |
| 5,409,049 A | 4/1995 | Renier | |
| 5,413,159 A | 5/1995 | Olney et al. | |
| 5,429,927 A | 7/1995 | Afseth et al. | |
| 5,468,129 A | 11/1995 | Sunden et al. | |
| 5,482,447 A | 1/1996 | Sunden et al. | |
| 5,495,879 A | 3/1996 | Cabestrero | |
| 5,512,439 A | 4/1996 | Hornes et al. | |
| 5,525,493 A | 6/1996 | Hornes et al. | |
| 5,538,062 A | 7/1996 | Stech | |
| 5,591,281 A * | 1/1997 | Loewe | 152/418 |
| 5,646,727 A | 7/1997 | Hammer et al. | |
| 5,707,215 A * | 1/1998 | Olney et al. | 417/233 |
| 5,759,820 A | 6/1998 | Hornes et al. | |
| 5,894,757 A | 4/1999 | Sully | |
| 5,941,692 A | 8/1999 | Olney et al. | |
| 5,941,696 A | 8/1999 | Fenstermacher et al. | |
| 6,092,545 A | 7/2000 | Bedore et al. | |
| 6,144,295 A | 11/2000 | Adams et al. | |
| 6,267,450 B1 | 7/2001 | Gamble | |
| 6,360,768 B1 | 3/2002 | Galler | |
| 6,463,798 B2 | 10/2002 | Niekerk et al. | |
| 6,474,832 B2 | 11/2002 | Murray | |
| 6,482,592 B1 | 11/2002 | Lundeberg et al. | |
| 6,494,693 B1 | 12/2002 | Sunden | |
| 6,742,386 B1 | 6/2004 | Larson | |
| 6,787,233 B1 | 9/2004 | Molteberg et al. | |
| 6,814,547 B2 | 11/2004 | Childers et al. | |
| 6,871,683 B2 | 3/2005 | Cobb | |
| 6,984,702 B2 | 1/2006 | Fonnum et al. | |
| 6,986,913 B2 | 1/2006 | Fonnum et al. | |
| 6,994,136 B2 | 2/2006 | Stanczak | |
| 7,117,731 B2 | 10/2006 | Hrabal | |
| 7,160,707 B2 | 1/2007 | Fonnum et al. | |
| 7,173,124 B2 | 2/2007 | Deggerdal et al. | |
| 7,217,762 B1 | 5/2007 | Joergedal et al. | |
| 7,222,487 B1 | 5/2007 | Hinkley | |
| 7,225,845 B2 | 6/2007 | Ellmann | |
| 7,237,590 B2 | 7/2007 | Loewe | |
| 7,255,323 B1 | 8/2007 | Kadhim | |
| 7,357,164 B2 | 4/2008 | Loewe | |
| 7,498,683 B2 | 3/2009 | Landwehr | |
| 7,506,663 B2 | 3/2009 | Thomas et al. | |
| 7,581,576 B2 * | 9/2009 | Nakano | 152/421 |
| 7,607,465 B2 | 10/2009 | Loewe | |
| 7,614,474 B2 | 11/2009 | Yang | |
| 7,625,189 B2 | 12/2009 | Cheng | |
| 7,704,057 B2 | 4/2010 | Malbec et al. | |
| 7,748,422 B2 | 7/2010 | Bol | |
| 7,763,689 B2 | 7/2010 | Fonnum et al. | |
| 7,784,513 B2 | 8/2010 | Loewe | |
| 7,810,582 B2 | 10/2010 | Webb | |
| 7,828,095 B2 | 11/2010 | Murata et al. | |
| 7,828,101 B2 | 11/2010 | Radtke et al. | |
| 7,847,421 B2 | 12/2010 | Gardner et al. | |
| 7,856,871 B2 | 12/2010 | Mancosu et al. | |
| 7,927,170 B2 | 4/2011 | Bickerton et al. | |
| 7,931,061 B2 | 4/2011 | Gonska et al. | |
| 7,931,817 B2 | 4/2011 | Bilski | |
| 7,975,789 B2 | 7/2011 | Murata | |
| 7,985,340 B2 | 7/2011 | Almaasbak et al. | |
| 7,989,614 B2 | 8/2011 | Deggerdal et al. | |
| 7,989,975 B2 | 8/2011 | Clement et al. | |
| 8,004,104 B2 | 8/2011 | Hench | |
| 8,022,561 B2 | 9/2011 | Ciglenec et al. | |
| 8,038,987 B2 | 10/2011 | Fonnum et al. | |
| 8,042,586 B2 | 10/2011 | Losey et al. | |
| 8,083,503 B2 | 12/2011 | Voltenburg, Jr. et al. | |
| 8,110,351 B2 | 2/2012 | Bosnes | |
| 8,113,254 B2 | 2/2012 | Benedict | |
| 8,747,084 B2 | 6/2014 | Richardson et al. | |
| 2004/0050760 A1 | 3/2004 | Siegfriedsen | |
| 2007/0018458 A1* | 1/2007 | Martinez | 290/53 |
| 2007/0040135 A1 | 2/2007 | Dyer et al. | |
| 2007/0068238 A1 | 3/2007 | Wendte | |
| 2007/0151648 A1 | 7/2007 | Loewe | |
| 2008/0247883 A1 | 10/2008 | Yokomachi et al. | |
| 2009/0301575 A1 | 12/2009 | Arnett | |
| 2010/0243121 A1 | 9/2010 | Eigenbrode | |
| 2011/0018275 A1* | 1/2011 | Sidenmark | 290/53 |
| 2011/0061621 A1 | 3/2011 | Finkenbiner | |
| 2011/0308953 A1 | 12/2011 | Bazant et al. | |
| 2012/0020822 A1* | 1/2012 | Richardson et al. | 417/477.2 |
| 2013/0251553 A1 | 9/2013 | Richardson et al. | |
| 2014/0186195 A1 | 7/2014 | Richardson et al. | |

FOREIGN PATENT DOCUMENTS

| | | |
|---|---|---|
| WO | 2009110001 A1 | 9/2009 |
| WO | 2012012617 A | 1/2012 |

* cited by examiner

PASSIVE PRESSURE REGULATION MECHANISM

CROSS-REFERENCE TO RELATED APPLICATIONS

This application claims the benefit of U.S. Provisional Application No. 61/613,406 filed 20 Mar. 2012, U.S. Provisional Application No. 61/637,206 filed 23 Apr. 2012, and U.S. Provisional Application No. 61/672,223 filed 16 Jul. 2012, which are incorporated in its entirety by this reference.

This application is also related to U.S. application Ser. No. 13/468,007 filed 10 May 2012, which is incorporated in its entirety by this reference.

TECHNICAL FIELD

This invention relates generally to the pumping field, and more specifically to a new and useful passive pressure regulator in the pumping field.

BACKGROUND

Passive pressurization systems can be desirable in many applications, particularly in those wherein the extra weight of an electrical energy storage device or the additional complexity of digital controls can be detrimental or inconvenient. However, passive pressurization systems can suffer from over-pressurization of a reservoir, wherein the pressurization system continues to pump fluid into the reservoir even after the desired reservoir pressure is reached. Conventional systems typically resolve this problem with a relief valve, wherein the relief valve vents the reservoir contents into the ambient environment when the reservoir pressure exceeds or meets the desired pressure. These systems lack a feedback loop that ceases continued pressurization of the reservoir when the desired pressure is reached, thereby reducing pump cycles and increasing pump lifespan.

Thus, there is a need in the passive pressurization field to create a new and useful passive pressure regulation system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
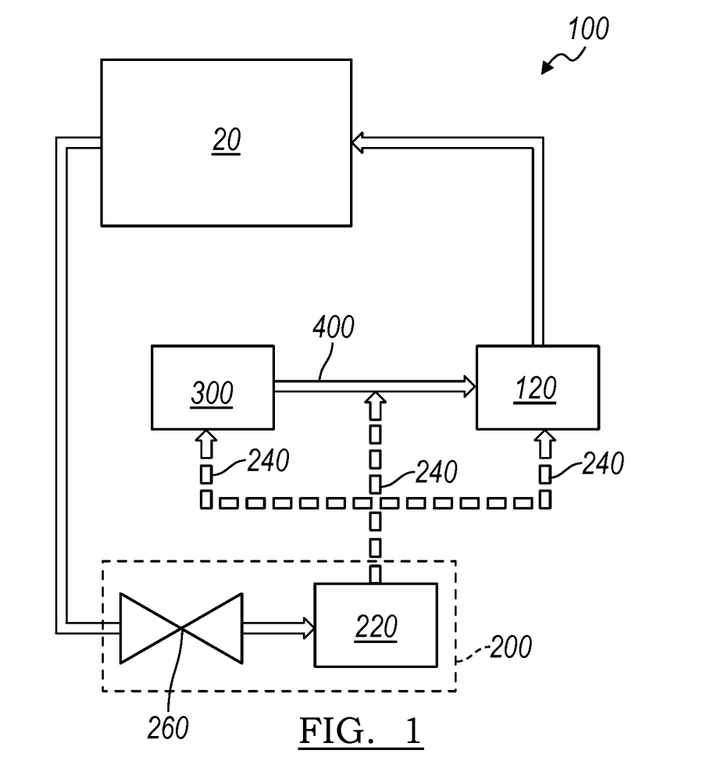
FIG. 1 is a schematic representation of the pressure regulation mechanism.

As shown in FIG. 1, the passive pressure regulation mechanism 200 of the pump system 100 includes a pump body 220, an actuating mechanism 240, and a valve 260 having a threshold opening pressure. The valve 26 can additionally include a threshold closing pressure. The pressure regulation mechanism 200 is preferably utilized in a pump system 100 that includes a reservoir 20 and a primary pump 120 driven by a drive mechanism 300, wherein the primary pump 120 pressurizes the reservoir 20. The passive pressure regulation mechanism 200 is preferably fluidly connected to a reservoir 20 by a fluid manifold and mechanically connected to a primary pump 120, wherein the primary pump 120 receives a pumping force from the drive mechanism 300 to pump fluid into the reservoir 20. The pressure regulation mechanism 200 preferably functions to passively cease pressurization of the reservoir 20 when a threshold reservoir pressure is reached. The pressure regulation mechanism 200 preferably ceases pressurization by ceasing force application from the drive mechanism 300 to the primary pump. Force application can be ceased by disconnecting the primary pump from the drive mechanism 300, or by ceasing force generation at the drive mechanism 300. This pressure regulation mechanism 200 can confer several benefits. First, the pressure regulation mechanism 200 passively controls the pressure of the reservoir 20, eliminating the need for sensors and other powered components. Second, the pressure regulation mechanism 200 can additionally include a timing feature that controls the duration between pump system shut off and pump system restart.

The reservoir 20 fluidly coupled to the pressure regulation mechanism 200 preferably receives fluid pumped by the pump system 100. The reservoir 20 preferably has a substantially large volume relative to the pressure regulation mechanism 200, such that the pressure regulation mechanism 200 volume (i.e., the total volume defined by the actuating mechanism 240 and the valve 260) is substantially insignificant relative to the reservoir volume (i.e., fluid flow into passive pressure regulation mechanism 200 does not significantly change the reservoir pressure). The reservoir volume can additionally be substantially large relative to the volume of the primary pump 120, such that the primary pump volume is substantially insignificant relative to the reservoir volume. The reservoir 20 is preferably a tire interior, but can alternatively be a chamber, balloon, or any other suitable fluid reservoir 20. The reservoir 20 is preferably fluidly connected to the pressure regulation mechanism 200 at an outlet, and fluidly connected to the primary pump 120 at an inlet.

The primary pump 120 of the pump system 100 functions to pump fluid into the reservoir 20, thereby pressurizing the reservoir 20. The primary pump 120 preferably includes a pump cavity 122 and an actuating element 124 that actuates within the pump cavity 122. The primary pump 120 is preferably a positive displacement pump including a pump cavity 122 and actuating element 124 defining a lumen therebetween, wherein the actuating element 124 preferably forms a substantially fluid impermeable seal with and translates within the pump cavity 122 to create pressure differentials that move a fluid from the pump inlet to the pump outlet. However, the primary pump 120 can be any other suitable pump. The positive displacement pump is preferably a reciprocating pump wherein the pump cavity 122 is a pump chamber and the actuating element 124 is a reciprocating element, but can alternatively be a peristaltic pump, wherein the pump cavity 122 is a groove 221 (e.g., circumferential groove) and the actuating element 124 is a diaphragm or tube. The reciprocating element can be a diaphragm, a piston, a diaphragm actuated by a piston (e.g., wherein the diaphragm defines the lumen and the piston receives the pumping force from the diaphragm to actuate the diaphragm, etc.), or any other suitable reciprocating element. The primary pump 120 is preferably operable between a pumping mode and a non-pumping mode. In the pumping mode, the actuating element 124 receives a pumping force from a drive mechanism 300 and translates along an actuation axis between a compressed position, wherein the actuating element 124 is proximal the closed end of the pump cavity 122, and a recovered position, wherein the actuating element 124 is distal the closed end. In the non-pumping mode, the actuating element 124 preferably does not receive a pumping force from the drive mechanism 300, and fluid movement through the primary pump 120 is preferably ceased.

The pump system 100 preferably additionally includes a force translator 400 that functions to connect the primary pump 120 to the drive mechanism 300. More preferably, the force translator 400 functions to connect the actuating element 124 to the drive component 321 (e.g., cam 320), wherein the force translator 400 translates relative motion between the drive mechanism 300 and the primary pump 120 into a variable occluding force. The force translator 400 preferably applies a force in a radially outward direction from the rotational axis, but can alternatively apply a force in a radially inward direction, in a direction substantially parallel to the rotational axis, in a direction at an angle to the rotational axis, or in any other suitable direction. In a first alternative of the pump system 100, the force translator 400 includes a planetary roller 401 that rolls about an interior or exterior arcuate surface of the cam (e.g., as disclosed in U.S. application Ser. No. 13/187,848, filed 21 Jul. 2011, incorporated herein in its entirety by this reference, but any other suitable system can be used). This alternative is preferably used when the primary pump 120 is a peristaltic pump, but can alternatively be used for any other suitable pump system 100. In a second alternative of the pump system 100, the force translator 400 is a roller with a rotational axis that is statically fixed to a point on the pump cavity 122, more preferably to the actuation axis of the primary pump 120. This alternative is preferably used with a reciprocating pump, but can alternatively be used with any other suitable pump. The roller is preferably in non-slip contact with a bearing surface of the cam 320, wherein the cam 32o preferably has a bearing surface with a varying curvature, such that the roller applies a variable force to the actuating element 124 as the roller rolls over the variable bearing surface. The roller slides relative to the actuating element 124, but can alternatively contact the actuating element 124 in any other suitable manner. In a third alternative of the pump system 100, the force translator 400 includes a linkage rotatably connected to a fixed point on the cam 320 and rotatably coupled to the actuating element 124, wherein the linkage preferably actuates the actuating element 124 through a compression stroke and a recovery stroke as the fixed point nears and retreats from the pump cavity position, respectively. Alternatively, the linkage can actuate the actuating element 124 through the compression stroke and recovery stroke as the fixed point retreats from and nears the pump cavity 122, respectively. The linkage preferably includes a single link, but can alternatively include two or more links rotatably connected at the respective ends. In a fourth alternative of the pump system 100, the force translator 400 includes a keyed piece that joins with a complimentary piece on drive mechanism 300 (e.g., tooth and gear). However, any other suitable force translator 400 can be used.

The drive mechanism 300 of the pump system 100 functions to provide a pumping force to the primary pump 120. The pumping force is preferably variable, but can alternatively be constant. The drive mechanism 300 is preferably passive and couples to a moving surface, but can alternatively be active (e.g., driven by a motor, etc.). The moving surface is preferably a rotating surface (a surface configured to rotate, such as a tire), but can alternatively be an oscillating surface (e.g., a wave), or any other suitable surface. The drive mechanism 300 preferably generates the pumping force by facilitating relative motion between the drive mechanism 300 and the primary pump 120. In one variation of the pump system 100, the primary pump 120 is statically coupled to a rotating surface while the drive mechanism 300 is held substantially static relative to the frame in which the rotating surface is rotating. For example, the rotating surface can rotate relative to a gravity vector, wherein the drive mechanism 300 is held substantially static relative to the gravity vector. However, the pumping force can be otherwise generated. The drive mechanism 300 preferably includes a force generator and a drive interface, wherein the force generator generates the pumping force, and the drive interface couples to the force translator 400. However, the drive mechanism 300 can be otherwise configured. The pump system 100 preferably includes one drive mechanism 300 for each primary pump 120, but can alternatively include one drive mechanism 300 for multiple primary pumps, or have any other suitable configuration.

In one variation of the pump system 100, the drive mechanism 300 includes a cam 320 and an eccentric mass 340. This drive mechanism 300 is preferably configured to statically couple to a rotating surface, but can alternatively be coupled to other surfaces. This drive mechanism 300 preferably generates a pumping force (occluding force) in a radial direction from a rotational axis of the drive mechanism 300, but can alternatively be a constant force, a force applied at any suitable angle to the rotational axis, or any other suitable force. The drive mechanism 300 includes a rotational axis about which the drive mechanism 300 rotates relative to the primary pump 120 (conversely, about which the primary pump 120 rotates relative to the drive mechanism 300). The rotational axis of the drive mechanism 300 is preferably the rotational axis of the cam 320, but can alternatively be the rotational axis of the eccentric mass 340, the rotational axis about which the primary pump rotates, or any other suitable rotational axis. The pump system 100 is preferably configured such that the rotational axis of the drive mechanism 300 is substantially aligned with the rotational axis of the rotating surface when the pump system 100 is coupled to the rotating surface, but the pump system 100 can alternatively be configured such that the rotational axis of the drive mechanism 300 is offset from the rotational axis of the rotating surface. The drive mechanism 300 additionally includes a center of mass, determined from the mass and positions of the cam 320 and the eccentric mass 340. The eccentric mass 340 is preferably coupled to the cam 320 such that the center of mass of the drive mechanism 300 is offset from the rotational axis of the drive mechanism 300.

The cam 320 of the drive mechanism 300 functions to provide a surface against which the pumping force is generated. In a first variation, the cam 320 includes an arcuate bearing surface that interfaces with the primary pump 120. More preferably, the arcuate bearing surface interfaces with a roller force translator 400 of the primary pump 120. In one alternative, the cam 320 includes a bearing surface with a variable curvature that controls the magnitude of the substantially linear, radial force applied to the primary pump 120. The cam 320 preferably functions to provide a substantially constant torque against the reciprocating element throughout the compression stroke, but can alternatively provide a variable torque against the reciprocating element throughout the compression or recovery strokes. The cam 320 preferably includes a bearing surface, wherein the profile of the bearing surface preferably controls the magnitude of the force throughout the compression stroke. The bearing surface is preferably continuous, but can alternatively be discontinuous. The bearing surface is preferably defined on the exterior of the cam 320 (exterior bearing surface or outer bearing surface) but can alternatively be defined within the interior of the cam 320 (interior bearing surface or inner bearing surface), wherein the bearing surface defines a lumen within the cam 320. The bearing surface is preferably arcuate, and preferably has a non-uniform curvature (e.g., a reniform profile). Alternatively, the bearing surface can have a uniform curvature (e.g., a circular profile), an angular profile, or any other suitable profile. The bearing surface preferably includes a compression portion and a recovery portion, corresponding to the compression stroke and the recovery stroke of the primary pump 120, respectively. The compression portion is preferably continuous with the recovery section, but can alternatively be discontinuous. The bearing surface preferably has a first section having a high curvature (preferably positive curvature or convex but alternatively negative curvature or concave) adjacent a second section having low curvature (e.g., substantially flat or having negative curvature compared to the first section). The bearing surface preferably additionally includes a third section connecting the first and second sections, wherein the third section preferably provides a substantially smooth transition between the first and second sections by having a low curvature adjacent the first section and a high curvature adjacent the second section. The compression portion preferably begins at the end of the second section distal the first section, extends along the third section, and ends at the apex of the first section. The compression portion is preferably convex (e.g., when the bearing surface is an external bearing surface), but can alternatively be concave. The apex of the first section preferably corresponds to the top of the compression stroke (compressed position). The recovery portion preferably begins at the apex of the first section, extends along the second section, and ends at the end of the second section distal the first section. The recovery portion is preferably substantially flat or concave (e.g., when the bearing surface is an external bearing surface), but can alternatively be convex. The end of the second section preferably corresponds to the bottom of the recovery stroke (recovered position). The slope of the compression portion is preferably less than 30 degrees, but can alternatively have any suitable angle. When a roller is used as the force translator 400, the curvature of the bearing surface is preferably at least three times larger than the roller curvature or roller diameter, but can alternatively be larger or smaller. However, the bearing surface can have any suitable profile. The cam 320 is preferably substantially planar with the bearing surface defined along the side of the cam 320, in a plane normal to the rotational axis of the cam (e.g., normal the broad face of the cam). The bearing surface is preferably defined along the entirety of the cam side, but can alternatively be defined along a portion of the cam side. The generated pump force is preferably directed radially outward of the rotational axis, more preferably along a plane normal to the rotational axis. Alternatively, the cam 320 can have a rounded or otherwise profiled edge segment (transition between the cam broad face and the cam side), wherein the bearing surface can include the profiled edge. Alternatively, the arcuate surface is defined by a face of the cam parallel to the rotational axis of the cam 320, wherein the generated pump force can be directed at any suitable angle relative to the rotational axis, varying from parallel to the rotational axis to normal to the rotational axis. The compression portion preferably encompasses the majority of the cam profile, but can alternatively encompass half the cam profile or a small portion of the cam profile. In one variation, the compression portion covers 315 degrees of the cam profile, while the recovery portion covers 45 degrees of the cam profile. However, the compression and recovery portions can cover any other suitable proportion of the cam profile.

In another alternative, the cam 320 is a disk with a substantially circular profile. In yet another alternative, the cam 320 is a sphere segment or catenoid, wherein the bearing surface is preferably defined along the arcuate surface. In yet another alternative, the cam 320 is a bearing rotatably coupled about an axle statically coupled to the rotating surface. The cam 320 can alternatively have any other suitable form factor or configuration.

The eccentric mass 340 (hanging mass) of the drive mechanism 300 functions to offset the center of mass of the drive mechanism 300 from the rotational axis of the drive mechanism 300. This offset can function to substantially retain the angular position of the cam 320 relative to a gravity vector, thereby engendering relative motion between the drive mechanism 300 and the primary pump 120 statically coupled to the rotating surface (that rotates relative to the gravity vector). The eccentric mass 340 is preferably a substantially homogenous piece, but can alternatively be heterogeneous. The eccentric mass 340 is preferably a distributed mass (e.g., extends along a substantial portion of an arc centered about the rotational axis), but can alternatively be a point mass. The eccentric mass 340 is preferably curved, but can alternatively be substantially flat, angled, or have other suitable shapes. The radius of the eccentric mass curvature is preferably maximized, such that the eccentric mass 340 traces an arcuate section of the energy extraction system perimeter. However, the eccentric mass 340 can have any other suitable curvature. The eccentric mass 340 preferably extends at least 80 degrees about the rotational axis of the drive mechanism 300, more preferably 180 degrees about the rotational axis, but can extend more or less than 180 degrees about the rotational axis. The eccentric mass 340 preferably has substantially more mass than the cam 320, but can alternatively have a substantially similar mass or a smaller mass. The eccentric mass 340 preferably imparts 2 in-lb (0.225 Nm) of torque on the cam 320, but can alternatively impart more or less torque.

The eccentric mass 340 is preferably a separate piece from the cam 320, and is preferably coupled to the cam 320 by a mass couple 360. The eccentric mass 340 can be statically coupled to the cam 320 or rotatably coupled to the cam 320. In the variation wherein the eccentric mass 340 is statically coupled to the cam 320, the eccentric mass 340 can be coupled to the cam 320 at the rotational axis of the cam 320, at the rotational axis of the drive mechanism 300, offset from the rotational axis of the cam 320, or at any other suitable portion of the cam 320. The eccentric mass 340 can be permanently connected to the cam 320. Alternatively, the eccentric mass 340 can be transiently connected (removably coupled) to the cam 320, wherein the eccentric mass 340 can be operable between a coupled mode wherein the eccentric mass 340 is coupled to the cam 320 and a decoupled mode wherein the eccentric mass 340 is rotatably coupled to the cam 320 or otherwise decoupled from angular cam motion. The mass couple 360 preferably has a high moment of inertia, but can alternatively have a low moment of inertia. The mass couple 360 is preferably a disk, but can alternatively be a lever arm, plate, or any other suitable connection. The mass couple 360 preferably couples to the broad face of the cam 320, but can alternatively couple to the edge of the cam 320, along the exterior bearing surface of the cam 320, to the interior bearing surface of the cam 320, to an axle extending from of the cam 320 (wherein the cam 320 can be statically fixed to or rotatably mounted to the axle), or to any other suitable portion of the cam 320. The mass couple 360 can couple to the cam 320 by friction, by a transient coupling mechanism (e.g., complimentary electric or permanent magnets located on the cam 320 and mass couple 360, a piston, a pin and groove mechanism, etc.), by bearings, or by any other suitable coupling means.

In another variation of the pump system 100, the drive mechanism 300 can be a linear actuator, such as a mechanical actuator, hydraulic actuator, pneumatic actuator, piezoelectric actuator, electro-mechanical actuator, or any other suitable linear actuator. The actuating portion of the linear actuator preferably connects to the actuating element 124 of the primary pump 120, but can alternatively connect with the pump cavity 122 of the primary pump 120. The linear actuator is preferably passive, but can alternatively be driven by a motor (e.g., an electric motor).

In another variation of the pump system 100, the drive mechanism 300 can be rotary actuator, such as a torque motor, electric motor, servo, stepper motor or any other suitable rotary actuator. The actuating portion of the rotary actuator preferably connects to the actuating element 124 of the primary pump 120 through the force translator 400 that converts the rotational motion into a linear motion, but can alternatively connect with the pump cavity 122 of the primary pump 120 through the force translator 400.

Figure 2A:
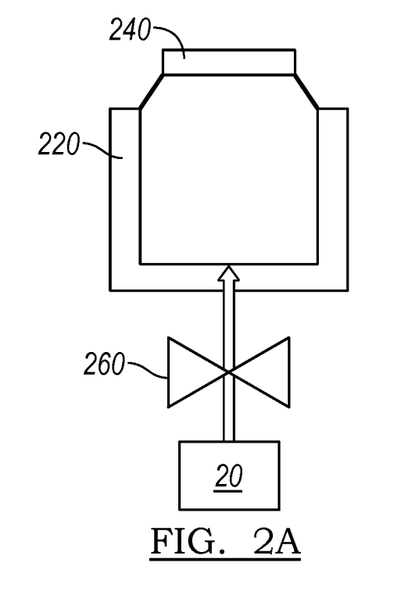
FIGS. 2A and 2B are schematic representations of the pressure regulation mechanism in the pressurized and depressurized modes.
Figure 2B:
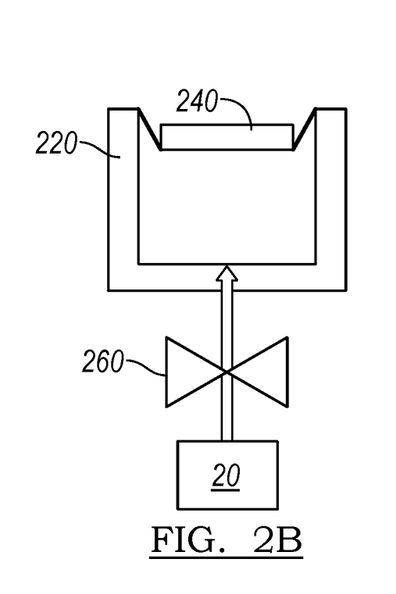

The pressure regulation mechanism 200 of the pump system 100 functions to cease pumping of the primary pump 120 when the reservoir pressure exceeds a threshold pressure. The pressure regulation mechanism 200 includes a pump body 220, an actuating mechanism 240, and a valve 260, wherein the valve 260 is fluidly connected to the pump body inlet and the actuating mechanism 240 actuates relative to a closed end of the pump body 220. The pump body 220 and actuating mechanism 240 preferably form a piston pump, wherein the pump body 220 is a pump chamber and the actuating mechanism 240 is a reciprocating element. The pump body 220 and actuating mechanism 240 can alternatively form any other suitable reciprocating pump or positive displacement pump. As shown in FIGS. 2A and 2B, the pressure regulation mechanism 200 is preferably operable in a pressurized mode and a depressurized mode. The pressurized mode is preferably achieved when the reservoir pressure exceeds the threshold pressure. More preferably, the pressurized mode is achieved when the reservoir pressure exceeds the opening pressure of the valve 260. In the pressurized mode, the valve 260 is preferably in an open position and permits fluid flow from the reservoir 20 into the pump body 220, wherein the pressure of the ingressed fluid places the actuating mechanism 240 in a pressurized position. In the pressurized position, the actuating mechanism 240 preferably ceases pumping force application to the primary pump 120. In the depressurized mode, the valve 260 is preferably in a closed position and prevents fluid flow from the reservoir 20 into the pump body 220, wherein a return mechanism places the actuating mechanism 240 in a depressurized position. The pump system 100 preferably includes at least one pressure regulation mechanism 200, but can alternatively include any suitable number of pressure regulation mechanisms.

The position of the pressure regulation mechanism 200, more preferably the position of the pump body 220, is preferably statically connected to the primary pump position, but can alternatively be moveably connected to the primary pump position. The angular position of the pressure regulation mechanism 200 is preferably maintained relative to the primary pump position, but the radial or linear distance can alternatively be maintained. The actuation axis of the pressure regulation mechanism 200 is preferably in the same plane as the actuation axis of the primary pump 120, but can alternatively be in different planes, perpendicular to the actuation axis of the primary pump 120, or arranged in any other suitable manner. The pressure regulation mechanism 200 is preferably arranged relative to the primary pump 120 such that the direction of the compression stroke of the pressure regulation mechanism 200 differs from the direction of the compression stroke of the primary pump 120. The direction of the compression stroke of the pressure regulation mechanism 200 directly opposes the direction of the compression stroke of the primary pump 120 (e.g., the closed end of the pump cavity 122 is distal the closed end of the pump body 220, and the actuating element 124 is proximal the reciprocating element, wherein the actuation axes are aligned or in parallel), but can alternatively be at an angle to the direction of the compression stroke of the primary pump 120. Alternatively, the pressure regulation mechanism 200 can be arranged such that the compression stroke of the pressure regulation mechanism 200 and the compression stroke of the primary pump 120 have substantially the same direction (e.g., the actuation axes are aligned or in parallel).

The pump body 220 functions to cooperatively define a pressurizable lumen with the actuating mechanism 240. The pump body 220 is preferably substantially rigid, but can alternatively be flexible. The pump body 220 is preferably an open pump body 220 with a closed end, wherein the pump body 220 preferably includes a closed end (bottom), walls extending from the closed end, and an opening opposing the closed end. However, the pump body 220 can alternatively have two open ends or any other suitable configuration. The closed end is preferably substantially flat, but can alternatively be curved or have any other suitable geometry. The walls are preferably substantially flat, but can alternatively be curved or have any other suitable geometry. The walls preferably join with the closed end at an angle, more preferably at a right angle, but the transition between the walls and the closed end can alternatively be substantially smooth (e.g., have a bell-shaped or paraboloid longitudinal cross section). The closed end is preferably substantially parallel to the opening defined by the walls, but can alternatively be oriented at an angle relative to the opening. The pump body 220 can be a groove defined in an arcuate or prismatic piece (e.g., in a longitudinal or lateral direction), a cylinder, a prism, or any other suitable shape. The pump body 220 preferably has a substantially symmetrical lateral cross section (e.g., circular, ovular, or rectangular cross section, etc.), but can alternatively have an asymmetrical cross section. The pump body 220 is preferably oriented within the pump system 100 such that the closed end is substantially normal to a radial vector extending from the rotational axis of the drive mechanism 300 (e.g., the normal vector from the closed end is substantially parallel to the radial vector), but can alternatively be oriented with the closed end at an angle to the radial vector. The pump body 220 is preferably oriented with the opening proximal and the closed end distal the rotational axis, particularly when the pump body 220 rotates about the cam exterior, but can alternatively be oriented with the opening distal and the closed end proximal the rotational axis, particularly when the pump body 220 rotates about the cam interior, or oriented in any other suitable position relative to the rotational axis.

The actuating mechanism 240 functions to control the pumping mode of the primary pump 120 based on the pressure within the pump body 220. The actuating mechanism 240 preferably translates within the pump body 220. The actuating mechanism 240 preferably forms a fluid seal with the pump body 220 to define a lumen, but can alternatively be located within the lumen of the pump body 220. The actuating mechanism 240 preferably translates along an actuation axis substantially aligned with the longitudinal axis of the pump body 220, but can alternatively actuate along any other suitable axis. The actuating mechanism 240 is preferably a piston coupled to a diaphragm, but can alternatively be a substantially flat surface, a piston, a roller, a cup, be substantially similar to the force translator 400, or have any other suitable form factor. The diaphragm is preferably a domed diaphragm with a folded perimeter, but can alternatively be any other suitable diaphragm.

The actuating mechanism 240 is preferably operable between a pressurized position and a depressurized position, corresponding to the pressurized mode and depressurized mode, respectively. The pressurized position is preferably achieved when the pump body lumen is pressurized to the threshold or reservoir pressure, and the depressurized position is preferably achieved when the pump body lumen is at a pressure less than the threshold pressure. The actuating mechanism 240 is preferably located at a position distal the closed end of the pump body 220 in the pressurized position, and is preferably located at a position proximal the closed end of the pump body 220 in the depressurized position. The actuating mechanism 240 can be beyond the pump body 220, level with the pump body opening, or encompassed by the pump body 220 when in the pressurized position. The actuating mechanism 240 is preferably level with the pump body opening or encompassed by the pump body 220 (retracted within the lumen) when in the depressurized position, but can alternatively be beyond (external) the pump body 220 when in the depressurized position. The actuating mechanism 240 can additionally include a return element (e.g., a spring, the primary pump 120, another pressurizable compartment, etc.) that applies a return force to return the actuating mechanism 240 to the depressurized position.

The depressurized position can include a compressed position and a recovered position. In the compressed position, a portion of the actuating mechanism 240 (e.g., the center) is preferably proximal the pump body closed end. In the recovered position, the portion of the actuating mechanism 240 is preferably distal the pump body closed end, and is preferably proximal the pump body opening. The actuating mechanism 240 preferably travels along a compression stroke to transition from the recovered position to the compressed position, and travels along a recovery stroke to transition from the compressed position to the recovered position.

Figure 3A:
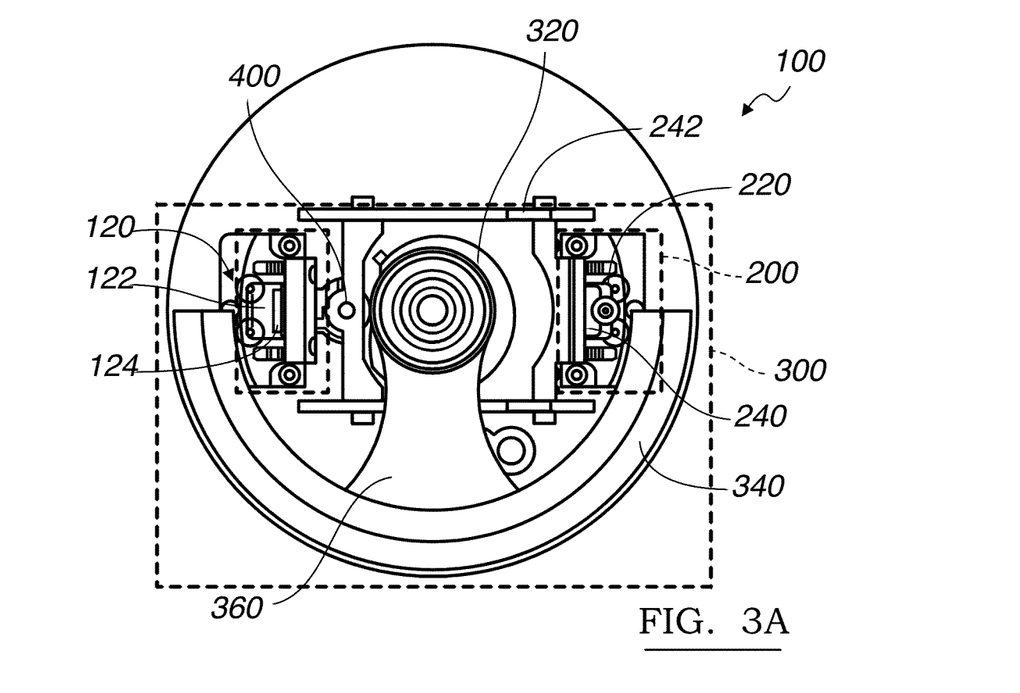
FIGS. 3A and 3B are cutaway views of a variation of the pressure regulation mechanism placing the pump system in the pumping and non-pumping modes, respectively.
Figure 3B:
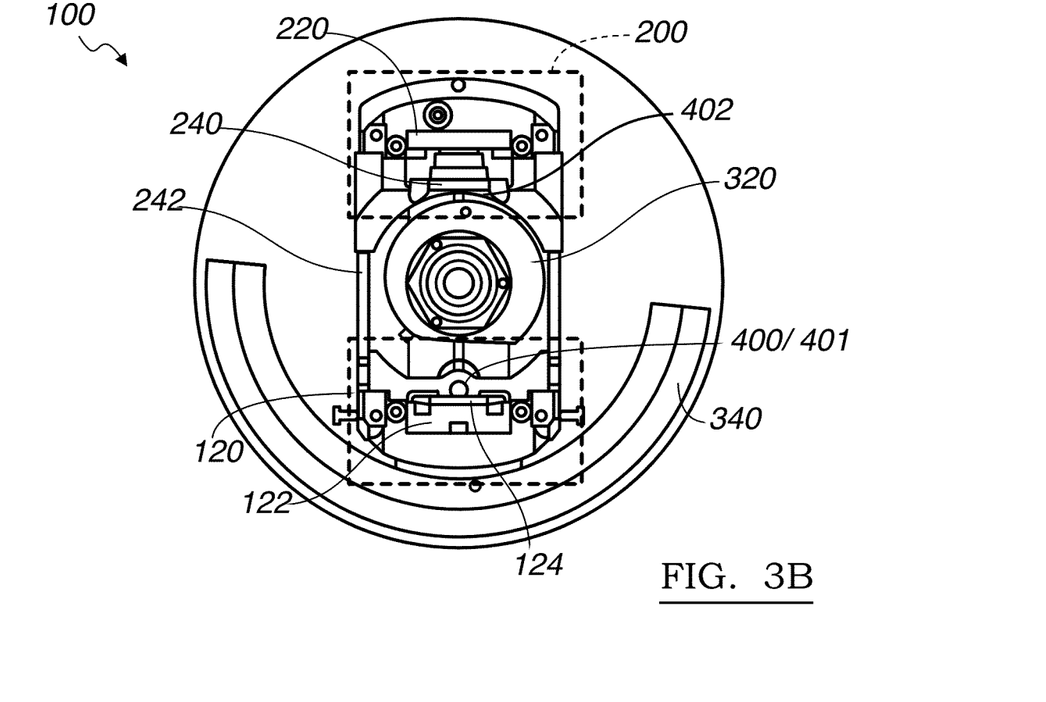
Figure 3C:
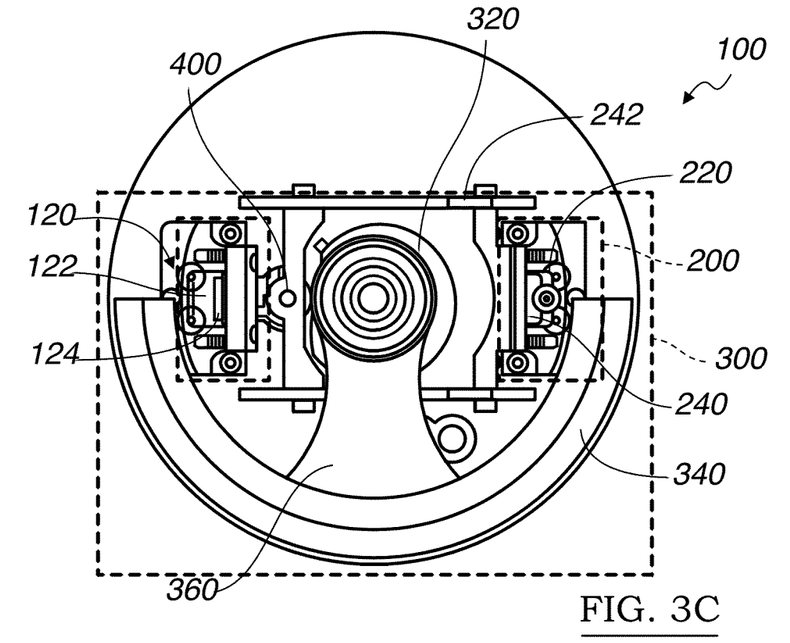
FIGS. 3C and 3D are cutaway views of an embodiment of the variant of the pressure regulation mechanism placing the pump system in the pumping and non-pumping modes, respectively.
Figure 3D:
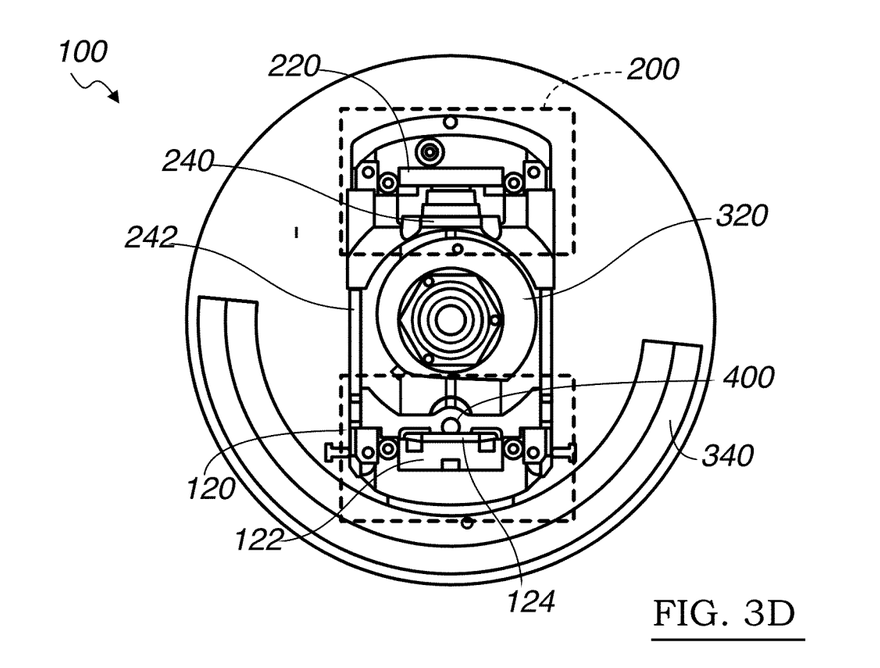

In a first variation of the pressure regulation mechanism 200, the actuation mechanism decouples the primary pump 120 or a primary pump component from drive mechanism 300 when in the pressurized position, and permits primary pump coupling with the drive mechanism 300 when in the depressurized position. An example of this variation in the depressurized and pressurized positions is shown in FIGS. 3A and 3B, respectively. The actuating mechanism 240 preferably decouples the force translator 400 from the drive mechanism 300, but alternatively decouples the actuating element 124 or the entirety of the primary pump 120 from the drive mechanism 300. The actuating mechanism 240 preferably moves the primary pump component along the actuation axis of the primary pump 120, away from the cam 320, when transitioning from the depressurized position to the pressurized position. However, the actuating mechanism 240 can move the primary pump component at an angle to the actuation axis of the primary pump 120, away from the cam 320 (e.g., in a perpendicular direction). The actuating mechanism 240 preferably translates the primary pump component within the plane encompassing the actuation axis or the pump body 220, but can alternatively translate the primary pump component out of said plane. The force exerted on the actuating mechanism 240 by the return element of the pump regulation system preferably couples the primary pump component with the drive mechanism 300 while returning the actuating mechanism 240 to the depressurized position, but the pump system 100 can alternatively include a second return element that couples the primary pump component to the drive mechanism 300 (e.g., a spring biased opposing the direction that the actuating mechanism 240 moves the primary pump component, etc.). The second return element preferably returns the primary pump component contact with the drive mechanism 300 when the decoupling force of the actuating mechanism 240 falls below the return force provided by the second return element.

A portion of the actuating mechanism 240 is preferably statically coupled to a portion of the primary pump 120, wherein actuating mechanism actuation results in a positional change of the primary pump 120 or a primary pump component. More preferably, actuating mechanism actuation preferably selectively couples and decouples the primary pump 120 from the drive mechanism 300 when the actuating mechanism 240 is in the depressurized and pressurized positions, respectively. The actuating mechanism 240 is statically coupled to the force translator 400, but can alternatively be statically coupled to the actuating element 124, statically coupled to the primary pump 120 as a whole, or statically coupled to any other suitable primary pump component. The actuating mechanism 240 is preferably statically coupled to the primary pump component by a frame 242, but can alternatively be coupled by a housing encapsulating the pump system 100, or by any other suitable coupling mechanism. The frame 242 can be aligned within the plane encompassing the actuation axis of the primary pump 120, within the plane encompassing the actuation axis of the pressure regulation mechanism 200, extend out of either of said two planes, or be otherwise oriented relative to the pump system 100. In a specific example, the force translator 400 is a roller, wherein the actuating mechanism 240 is coupled to the rotational axis of the roller by a frame 242 aligned with a plane encompassing both the actuation axis of the pressure regulation mechanism 200 and the actuation axis of the primary pump 120 (wherein the pressure regulation mechanism 200 and primary pump 120 preferably share a common plane). Alternatively, the actuating mechanism 240 transiently couples to the primary pump component when in the pressurized position, and is retracted away from the primary pump component when in the depressurized position.

Figure 4A:
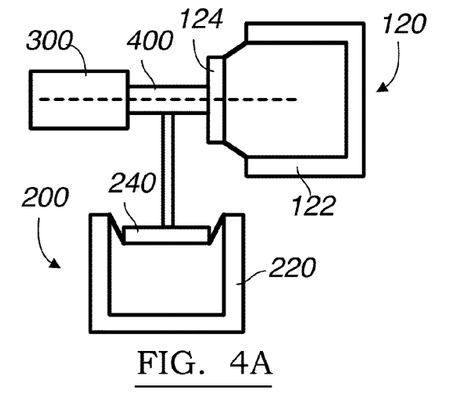
FIGS. 4A and 4B are schematic representations of a second variation of the pressure regulation mechanism placing the pump system in the pumping and non-pumping modes, respectively.
Figure 4B:
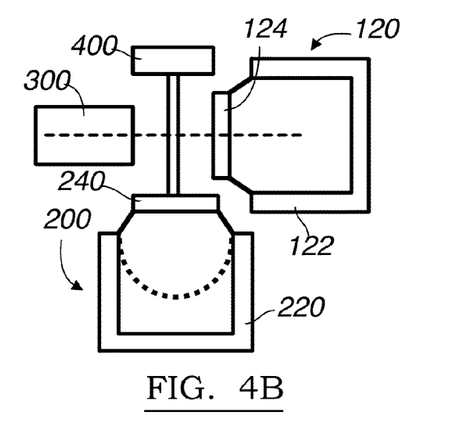

In a second variation of the pressure regulation mechanism 200, the actuating mechanism 240 decouples the force translator 400 from the primary pump 120 in the pressurized position, and permits force translator coupling with the primary pump 120 when in the depressurized position. An example of this variation in the depressurized and pressurized positions is shown in FIGS. 4A and 4B, respectively. The actuating mechanism 240 preferably connects to and moves the force translator linear position relative to the drive mechanism 300 when in the pressurized position, but can alternatively connect to and move the primary pump 120 relative to the force translator 400 and drive mechanism 300. The actuating mechanism 240 preferably moves the force translator 400 out of the common plane shared by the primary pump 120 and the drive mechanism 300, but can alternatively move the force translator 400 out of line with the actuation axis (e.g., perpendicular, within the common plane). The actuating mechanism 240 can be statically coupled to the force translator 400 or primary pump 120 by a frame 242, a weld, or any other suitable coupling mechanism. Alternatively, the actuating mechanism 240 can be transiently coupled to the force translator 400 or primary pump 120, wherein the actuating mechanism 240 can be a piston or rod that transiently couples to the force translator 400 or primary pump 120 through a coupling feature (e.g., a groove) or friction.

Figure 5A:
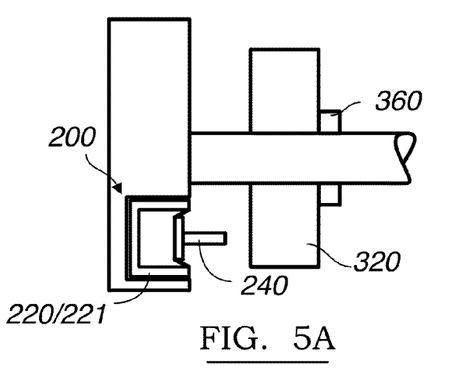
FIGS. 5A and 5B are schematic representations of a third variation of the pressure regulation mechanism placing the pump system in the pumping and non-pumping modes, respectively.
Figure 5B:
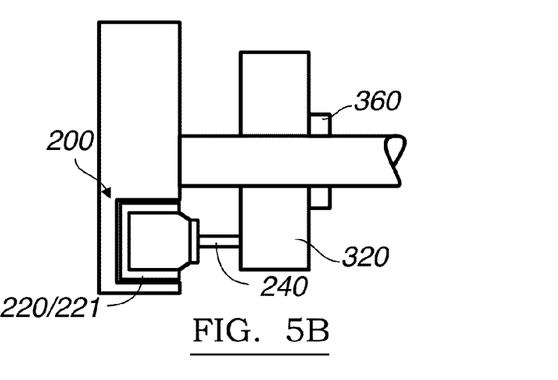
Figure 6A:
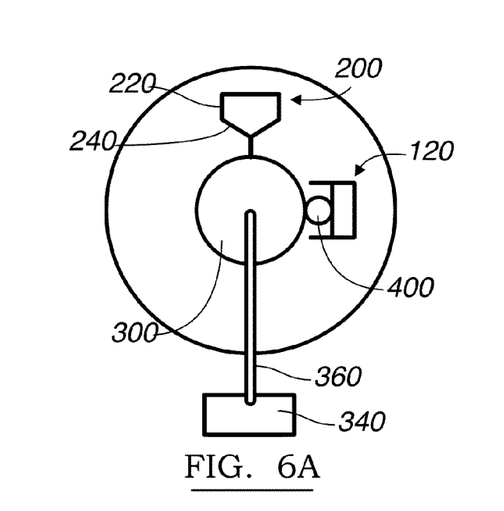
FIGS. 6A and 6B are schematic representations of a fourth variation of the pressure regulation mechanism placing the pump system in the pumping and non-pumping modes, respectively.
Figure 6B:
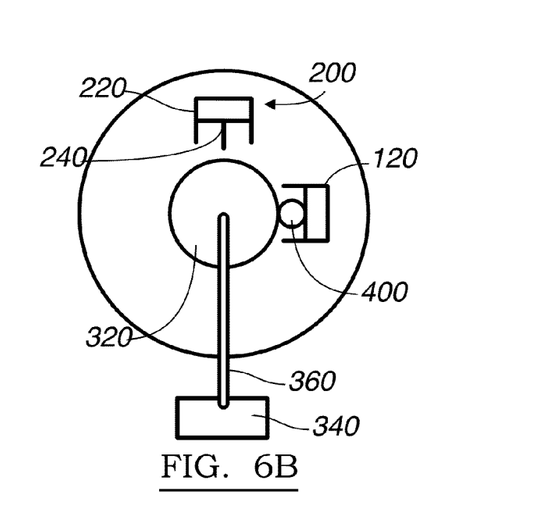
Figure 7A:
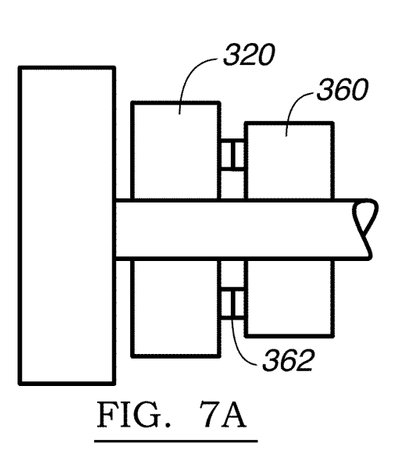
FIGS. 7A and 7B are schematic representations of a fifth variation of the pump system with the pressure regulation mechanism in the pressurized and depressurized modes, respectively.
Figure 7B:
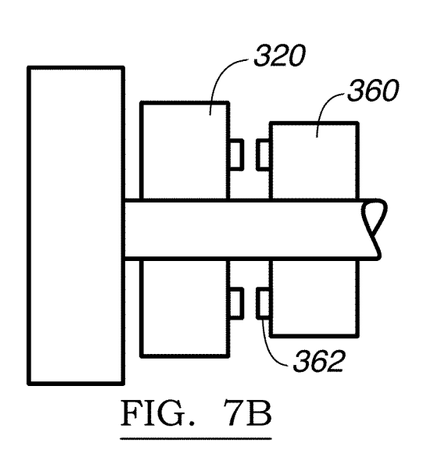

In a third variation of the pressure regulation mechanism 200, the actuating mechanism 240 ceases force generation. In one alternative, the pressure regulation mechanism 200 statically couples the drive mechanism 300 to the primary pump 120, ceasing force generation by eliminating the relative motion between the drive mechanism 300 and the primary pump 120. Examples of this variation in the depressurized position are shown in FIGS. 5A and 6A, respectively, and pressurized positions are shown in FIGS. 5B and 6B, respectively. For example, when the drive mechanism 300 includes a cam 320 and eccentric mass 340, the actuating mechanism 240 can statically couple the angular position of the cam 320 with the angular position of the primary pump 120 in the pressurized position, and decouple the angular position of the cam 320 from the angular position of the primary pump 120 in the depressurized position. In a specific example, the actuating mechanism 240 is a rod that couples to the cam broad face by friction. In another specific example, the actuating mechanism 240 is a rod that extends into a groove in the cam face when in the pressurized position and is retracted from the groove when in the depressurized position. In another specific example, the actuating mechanism 240 statically couples to the arcuate bearing surface of the cam 320. However, other mechanisms of transiently retaining the cam angular position can be envisioned. In another example, the actuating mechanism 240 can statically couple the angular position of the eccentric mass 340 with the angular position of the primary pump 120. In a specific example, the actuating mechanism 240 can include a rod that couples to the broad face of the eccentric mass 340 or to the mass couple 360 by friction. In another specific example, the actuating mechanism 240 is a rod that extends into a groove in the eccentric mass face when in the pressurized position and is retracted from the groove when in the depressurized position. However, other mechanisms of transiently retaining the eccentric mass angular position can be envisioned. In another example, the pump cavity 122 of the primary pump 120 can be statically coupled to the drive mechanism 300, such that relative motion between the actuating element 124 and the pump cavity 122 is ceased (e.g., when a linear or rotary actuator is used). In another alternative, the pressure regulation mechanism 200 decouples the force generator from the drive interface of the drive mechanism 300. For example, when the cam 320 and eccentric mass 340 are transiently coupled by a transient coupling mechanism, the actuating mechanism 240 can actuate the cam 320, eccentric mass 340, or coupling mechanism to decouple the cam 320 from the eccentric mass 340. In one specific example, if the cam 320 is coupled to the eccentric mass 340 along the respective broad faces by a ring of magnets 362 encircling the rotational axis, as shown in FIG. 7A, the actuating mechanism 240 can extend through a hole in the cam 320 (or eccentric mass 340) and push against the broad face of the eccentric mass 340 (or cam 320) to decouple the eccentric mass 340 from the cam 320, as shown in FIG. 7B. The actuating mechanism 240 can be statically coupled to the force translator 400 or primary pump 120 by a frame 242 or other coupling mechanism. Alternatively, the actuating mechanism 240 can be transiently coupled to the force translator 400 or primary pump 120, wherein the actuating mechanism 240 can be a piston or rod that couples to the force translator 400 or primary pump 120.

In another variation of the pressure regulation mechanism, the pressure regulation mechanism 200 switches the primary pump 120 from the pumping mode and a locked mode. The primary pump 120 preferably pumps fluid in the pumping mode and does not pump fluid in the locked mode. More preferably, components of the pump system are held in static relation relative to each other in the locked mode, such that the actuating element 124 is held substantially static. The primary pump 120 is preferably placed in the locked mode when the pressure of the reservoir 20 exceeds the opening threshold pressure of the valve 260, and is preferably placed in the pumping mode when the pressure of the reservoir 20 falls below the closing threshold pressure of the valve 260. More specifically, when the pressure of the reservoir 20 exceeds the opening threshold pressure, the valve 260 opens, allowing pressurized air to flow from the reservoir 20 into the compression volume of the primary pump 120, substantially retaining the actuating element 124 in the initial position of the compression stroke (e.g., in the recovered position). In this manner, the increased force of pressurized air on the actuating element 124 substantially opposes cam motion when the actuating element 124 is located at the second section of the cam profile, but can alternatively or additionally oppose cam motion when the actuating element 124 is located at the first section or third section of the cam profile. Since the cam 320 is preferably configured to only apply a small force to the actuating element 124 at the second section, the cam 320 cannot overcome the large back force applied by the backflow on the actuating element 124. These aspects of the pump system effectively cease pumping within the primary pump 120. The force applied by the backflow prevents cam movement relative to the primary pump 120, causing the cam 320 and subsequently, the eccentric mass 340, to rotate with the pump system 10. When the pump system includes multiple pumps, all the pumps are preferably flooded with pressurized air. Alternatively, a single pump can be flooded with pressurized air, alternating pumps can be flooded with pressurized air, or any other suitable subset of the pumps can be flooded to cease pumping.

However, any other suitable means of ceasing pumping force application to the actuating element can be used.

The valve 260 of the pressure regulation mechanism 200 functions to selectively permit fluid flow into the pump body 220 of the pressure regulation system. The valve 260 preferably has an opening threshold pressure substantially equal to the desired reservoir pressure (e.g., the upper limit of a desired reservoir pressure range), and can additionally have a closing threshold pressure under, over, or equal to the desired reservoir pressure (e.g., the lower limit of a desired reservoir pressure range). The valve 260 can additionally function as a timer, and have a pumping resumption pressure at which primary pump pumping is resumed. The pumping resumption pressure is preferably determined by the ratio of the first and second pressurization areas within the valve. Alternatively, the pressure regulation mechanism 800 can include a timer that functions to delay the resumption of pumping after the closing threshold pressure is reached. The valve 260 is preferably located in the fluid manifold fluidly connecting the reservoir 20 with the pump body 220. However, the valve 260 can be located within the reservoir 20 or within the pump body inlet. The opening threshold pressure is preferably a higher pressure than the closing threshold pressure, wherein the opening and closing threshold pressures are preferably determined by the return force applied by the return element. The valve state is preferably determined by the pressure within the second reservoir 500. The pumping resumption pressure is preferably lower than the closing threshold pressure, but can alternatively be higher than the closing threshold pressure or be any suitable pressure. The valve 260 is preferably operable between an open mode when a reservoir pressure exceeds an opening threshold pressure, wherein the valve 260 permits fluid flow from the reservoir 20 into the pump body 220, and a closed mode when the reservoir pressure is below the closing threshold pressure, wherein the valve 260 prevents fluid flow from the reservoir 20 into the pump body 220. Pumping by the primary pump 200 is preferably resumed when the pressure within the second pump 820 falls below the pumping resumption pressure, but can alternatively be resumed when the reservoir pressure falls below the closing threshold. The valve 260 is preferably a snap-action valve, but can alternatively be any other suitable valve. The valve 260 preferably includes a valve member 261 that seats within a valve body 262, and can additionally include a return mechanism 263 (e.g., a spring) that biases the valve member 261 against the valve body 262. The valve member 261 and valve body 262 can be different materials (e.g., to compensate for material expansion due to temperature changes), or can be made of the same material or materials with similar expansion coefficients.

In one variation of the pressure regulation mechanism 200, the snap-action valve is substantially similar to the valve described in U.S. application Ser. No. 13/468,007 filed 10 May 2012.

Figure 8:
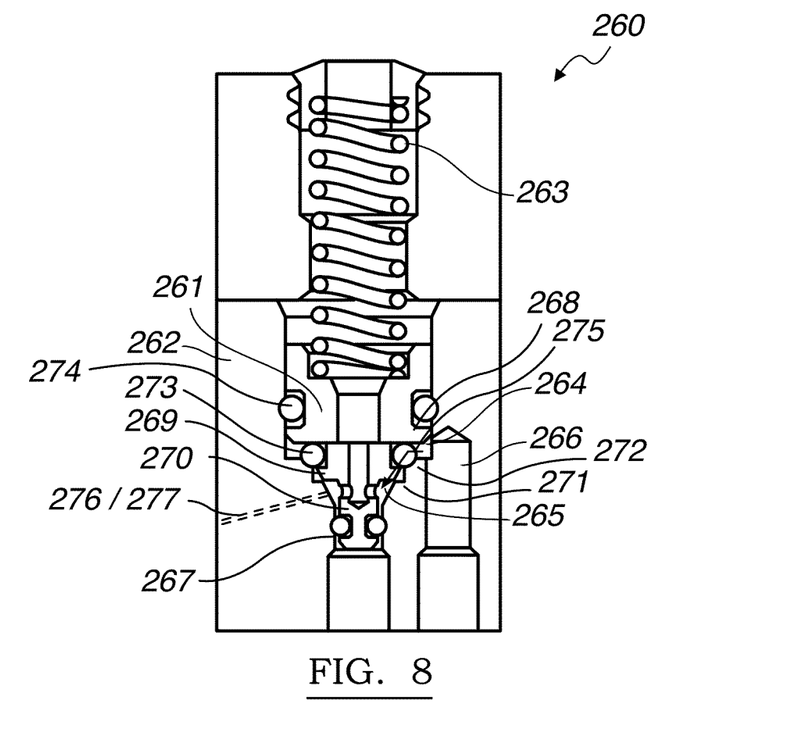
FIG. 8 is a cutaway view of a variation of the valve.

In another variation of the pressure regulation mechanism 200, as shown in FIG. 8, the snap-action valve includes a valve member 261, a valve body 262, a spring, a first volume 264, a second volume 265, a reservoir channel 266, and a manifold channel 267. The spring, or return element 263, biases the valve body 262 against the valve member 261. The spring constant of the spring is preferably selected based on the desired reservoir pressure (threshold pressure or cracking pressure) and the desired valve operating characteristics. The first volume 264 is preferably defined between the valve body 262 and valve member 261, and preferably has a first pressurization area normal to a direction of spring force application. The second volume 265 is preferably also defined between the valve body 262 and valve member 261, and preferably has a second pressurization area normal to the direction of spring force application. The reservoir channel 266 preferably fluidly connects the first volume 264 with the reservoir 20. The manifold channel 267 is preferably defined through the valve body 262, and is preferably fluidly connected to the pressure regulation mechanism 200. The manifold channel 267 is preferably defined along the axis of return force application, opposing the return element across the valve member 261, but can alternatively be defined in any other suitable location. The valve 260 can additionally include a timing mechanism 276 fluidly coupling the second volume 265 to an ambient environment, wherein the timing mechanism 276 preferably leaks air at a substantially controlled rate. In one variation, the timing mechanism 276 is a timing channel 2y that has a cross section selected based on a desired leak rate. The ratio of the first pressurization area to the second pressurization area is preferably selected based on the desired amount of time the valve 260 takes to recover the closed position, but can alternatively be any suitable ratio. However, the timing mechanism can be a porous plug (e.g., wherein the porosity can be selected based on the desired leak rate), an air permeable membrane, or any other suitable gas permeable mechanism that leaks air at a controlled rate. The combined volume of the first and second volumes are preferably substantially insignificant relative to the reservoir volume. The valve 260 is preferably operable between an open position and closed position. In the open position, the valve body 262 and valve member 261 cooperatively define a connection channel fluidly connecting the first volume 264 with the second volume 265, wherein the valve member 261 is located distal the valve body 262. The open position is preferably achieved when a pressure force generated by a pressure within the first volume 264 overcomes the spring force applied by the spring on the valve body 262. In the closed mode, the valve member 261 and valve body 262 cooperatively seal the connection channel and the valve member 261 substantially seals the manifold channel 267, wherein the valve member 261 seats against the valve body 262. The closed mode is preferably achieved when the pressure force is lower than the applied spring force. In one alternative of the valve 260, the valve member 261 has a symmetric cross section including a stem 270 configured to fit within the manifold channel 267, a first overhang extending from the stem, and a second overhang extending from the first overhang. The valve body 262 includes a cross section complimentary to the valve member cross section, including a first step 271 defining the manifold channel 267, a second step 272 extending from the first step, and walls extending from the second step. The first volume 264 is preferably defined between the second step 272 and the second overhang 268 the second volume 265 is preferably defined, between the first step 271 and the first overhang 269, and the connection channel is preferably defined between a transition from the first overhang to the second overhang and a transition between the first step to the second step. The valve 260 can further include gaskets bordering and cooperatively defining the first and second volumes 265. In one alternative of the valve 260, the valve 260 includes a first gasket 273 located within the connection channel 275 that forms a first substantially fluid impermeable seal with the valve member 261 in the closed mode and a second fluid impermeable seal 274 defined between the second overhang and the walls. The valve 260 can additionally include a gasket within the manifold channel 267 that forms a fluid impermeable seal with the stem when the valve 260 is in the closed mode (e.g., to cooperatively define the second volume 265), and permits fluid flow therethrough when the valve 260 is in the open mode.

Figure 9A:
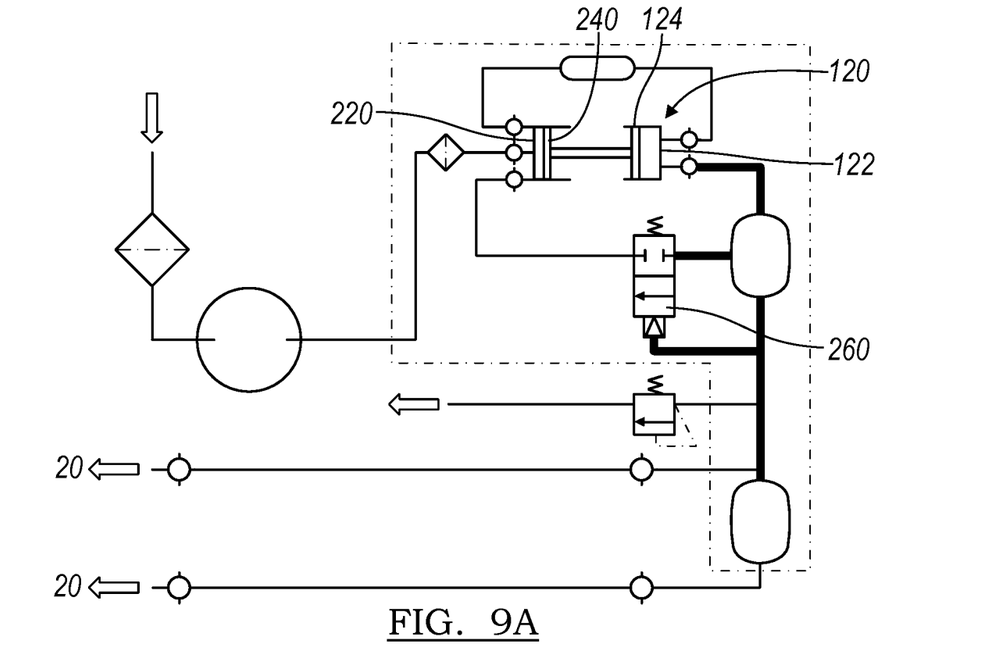
FIGS. 9A and 9B are schematic representations of fluid flow through the pump system in the pumping and non-pumping modes, respectively.
Figure 9B:
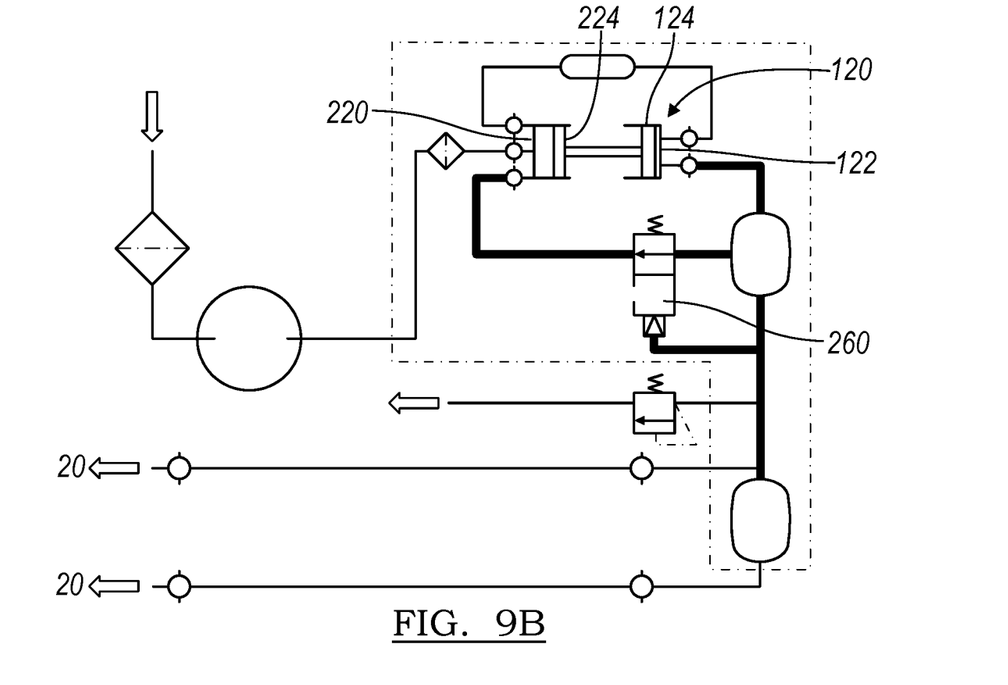
Figure 10A:
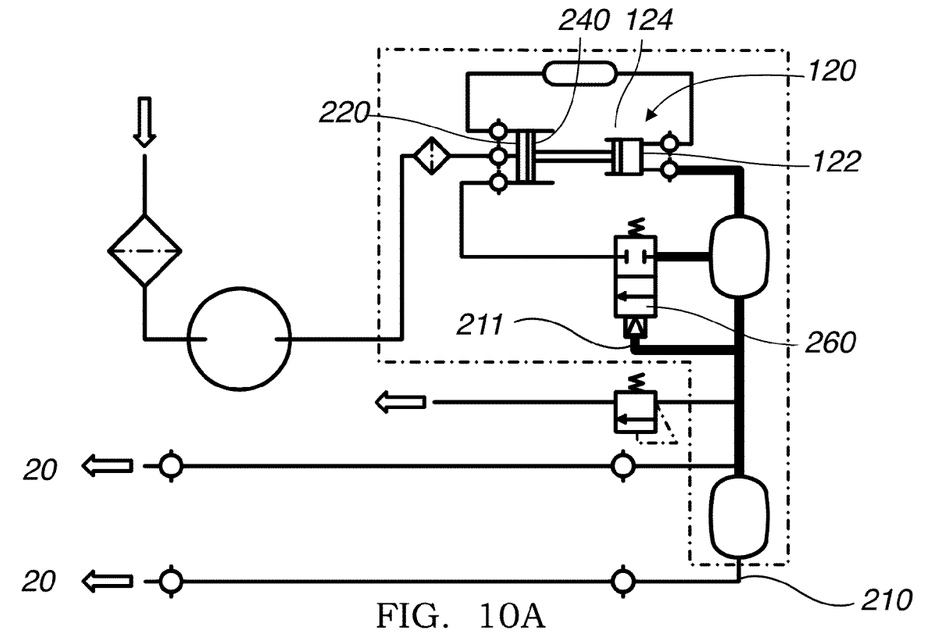
FIGS. 10A and 10B are schematic representations of fluid flow through a variation of the pump system in the pumping and non-pumping modes, respectively.
Figure 10B:
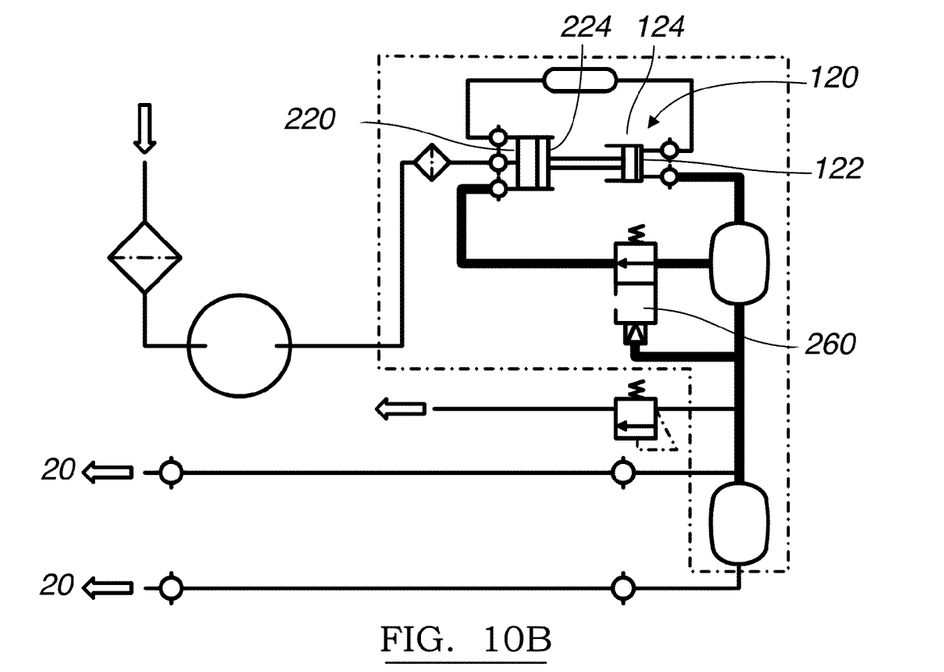

In one embodiment of the pump system 100, as shown in FIGS. 3A and 3B, the pump system moo includes a first and a second reciprocating pump, a drive mechanism 300, a first and a second force translator (400 and 402, respectively) connected to the first and second reciprocating pumps, respectfully, the first and second force translators having a first and second axis in fixed relation, respectively, a fluid manifold 210 (e.g., inlet manifold 211) fluidly connecting the second reciprocating pump to a reservoir 20, and a valve 260 located within the fluid manifold 210. The first pump preferably includes an outlet fluidly connected to the reservoir 20, wherein the first pump pumps fluid to and pressurizes the reservoir 20 (as shown in FIG. 9A). The first pump preferably includes an inlet fluidly connected to a fluid source, wherein the fluid source can be the ambient environment, the housing (e.g., wherein the housing encloses desiccated air), or any other suitable fluid source. The second pump can additionally include an inlet (separate from that coupled to the fluid manifold but alternatively the same one) and an outlet fluidly connected to the fluid source and reservoir 20, respectively wherein the second pump can pump fluid to and pressurize the reservoir 20. Alternatively, the inlet and outlet of the second pump can be fluidly connected to the fluid source and to the inlet of the first pump, respectively, thereby forming a two-stage pump. In this alternative, fluid is pressurized to a first pressure within the second pump and pressurized to a second pressure at the first pump. The first and second reciprocating pumps preferably include a first and second pump chamber, respectively, and a first and second reciprocating element, respectively. The first and second reciprocating pumps preferably share a common plane (e.g., the respective actuating axes share a common plane), but can alternatively be located in different planes. The first and second reciprocating pumps are preferably equally radially distributed about the drive mechanism 300, more preferably equally distributed about the rotational axis of the drive mechanism 300. However, the pumps can be otherwise distributed. The positions of the first and second pump chambers are preferably statically fixed by a housing or other component, wherein the housing statically couples the pump system 100 to a rotating surface and can additionally enclose the pump system 100. The first and second reciprocating pumps preferably oppose each other, wherein the closed end of the first pump chamber is distal the closed end of the second pump chamber and the first reciprocating element is proximal the second reciprocating element. The first reciprocating element preferably has a first pressurization area (area that receives or generates a pressure force) and the second reciprocating element preferably has a second pressurization area. The first pressurization area is preferably smaller than the second pressurization area, but can alternatively be larger or smaller. The drive mechanism 300 preferably includes a rotational axis, a cam 320 rotatable about the rotational axis, the cam 320 having a bearing surface, and an eccentric mass 340 coupled to the cam 320 that offsets the center of mass of the drive mechanism 300 from the rotational axis. The first force translator 400 is preferably couplable to the bearing surface of the cam 320 in non-slip contact, and is preferably statically connected to the reciprocating element of the first pump along an axis (e.g., rotational axis). The second force translator 400 preferably slips relative to the bearing surface of the cam 320, but can alternatively couple in non-slip contact with the bearing surface. The second force translator 400 is preferably statically connected to the reciprocating element of the second pump along an axis (e.g., rotational axis). The first and second force translators can each be a roller, a piston, a piston coupled to the roller at the rotational axis, or any other suitable force translator 400. The positions of the first and second force translators are preferably statically retained by a frame 242, but can alternatively be retained by any other suitable mechanism. The frame 242 preferably surrounds the drive mechanism 300, such that the drive mechanism 300 is located within the area bounded by the frame 242. However, the frame 242 can be otherwise arranged relative to the drive mechanism 300. The frame 242 is preferably located in the common plane shared by the first and second pumps, but can alternatively be located in a separate plane (e.g., extend normal to said plane and extend along a second plane parallel to the first). In operation, a radial or linear position of the frame 242 preferably shifts from a first position to a second position relative to a point on the drive mechanism 300 (e.g., rotational axis) when the second reciprocating element moves from the depressurized position to the pressurized position, respectively. The distance between the first position and the second position is preferably substantially similar to the distance between the depressurized position and the pressurized position, but can alternatively be larger (e.g., wherein the frame 242 amplifies the change in reciprocating element position) or smaller. Frame movement preferably results in simultaneous first and second force translator movement, coupling the first force translator 400 to the drive mechanism 300 in the first position and decoupling the first force translator 400 from the drive mechanism 300 in the frame's second position. Alternatively, frame movement can result in first and second reciprocating pump movement relative to the drive mechanism 300, wherein the frame 242 statically connects the positions of the first and second pump chambers. However, the force translators can be otherwise connected and disconnected to the drive mechanism 300. The frame 242 can additionally include features, such as arcuate grooves on the surface of the frame proximal the drive mechanism, which facilitate second force translator slip relative to the bearing surface. The fluid manifold preferably fluidly connects the reservoir 20 to an inlet of the second pump, but can additionally fluidly connect the reservoir 20 to an inlet of the first pump. In the latter alternative, the valve 260 is preferably located upstream of the junction between the three fluid connections or within the junction. In this latter alternative, valve opening simultaneously floods both lumens of the first and second reciprocating pumps. Because second reciprocating pump preferably has a larger pressurization area than the first reciprocating pump, the second reciprocating pump preferably exerts a linear (e.g., radial) decoupling force on the frame 242 when pressurized, which is transferred by the frame 242 into a shift in the position of the first force translator 400 away from the drive mechanism 300, effectively decoupling the first force translator 400 from the drive mechanism 300 (as shown in FIG. 9B).

As a person skilled in the art will recognize from the previous detailed description and from the figures and claims, modifications and changes can be made to the preferred embodiments of the invention without departing from the scope of this invention defined in the following claims.

I claim:

1. A pump system, comprising:
   a drive mechanism;
   a first reciprocating pump having a first reciprocating area, the first pump chamber having a first outlet fluidly connected to a reservoir;
   a second reciprocating pump having a second reciprocating area larger than the first reciprocating area;
   a fluid manifold fluidly connecting the first reciprocating pump, the second reciprocating pump, and the reservoir;
   a valve having an opening pressure and a closing pressure lower than the opening pressure, the valve located within the fluid manifold and operable between: an open mode when a reservoir pressure exceeds the opening pressure, wherein the valve permits fluid flow from the reservoir to the first and second reciprocating pumps; and a closed mode when the reservoir pressure is below the closing pressure, wherein the valve prevents fluid flow from the reservoir to the first and second reciprocating pumps;

a pressure regulation mechanism comprising a first and second force translator in fixed relation, the first and second force translator configured to actuate the first and second reciprocating areas, respectively, the pressure regulation mechanism operable between: a pumping mode when the valve is in the closed mode, wherein the first force translator is connected to the drive mechanism; and a non-pumping mode when the valve is in the open mode, wherein the first force translator is decoupled from the drive mechanism.

2. The system of claim 1, wherein the pressure regulation mechanism further comprises a frame that retains the first and second force translators in fixed relation.

3. The system of claim 2, wherein the frame is located in a first position relative to the drive mechanism in the pumping mode and in a second position relative to the drive mechanism in the non-pumping mode, wherein the first position is different from the second position.

4. The system of claim 1, wherein an outlet of the second reciprocating pump is fluidly connected to an inlet of the first reciprocating pump.

5. The system of claim 1, wherein the first and second reciprocating pumps comprise a first and second volume, respectively, wherein the first and second volumes are substantially insignificant relative to a reservoir volume.

6. The system of claim 1, wherein a first direction of a first compression stroke of the first reciprocating pump differs from a second direction of a second compression stroke of the second reciprocating pump.

7. The system of claim 6, wherein the first and second reciprocating pumps are substantially equally radially distributed about the pump system.

8. The system of claim 1, wherein the valve comprises a snap action valve.

9. The system of claim 8, wherein the snap action valve comprises:
 a valve body;
 a valve member;
 a spring biasing the valve body against the valve member, the spring having a spring constant defining the opening pressure;
 a first volume defined between the valve body and valve member, the first volume having a first pressurization area normal to a direction of spring force application;
 a second volume defined between the valve body and valve member, the second volume having a second pressurization area normal to the direction of spring force application;
 a reservoir channel fluidly connecting the first volume with the reservoir;
 a manifold channel defined within the valve body and fluidly connected to the second reciprocating pump;
 wherein the valve is operable between: an open position when a pressure force generated by a pressure within the first volume overcomes the spring force applied by the spring on the valve body, wherein the valve member is located distal the valve body, wherein the valve body and valve member cooperatively define a connection channel fluidly connecting the first volume with the second volume; and a closed position when the pressure force is lower than the spring force, wherein the valve member and valve body cooperatively seal the connection channel, wherein the valve member substantially seals the manifold channel.

10. The system of claim 8, wherein the valve member comprises a symmetric cross section comprising a stem configured to fit within the manifold channel, a first overhang extending from the stem, and a second overhang extending from the first overhang; wherein the valve body comprises a complimentary cross section to the valve member cross section, comprising a first step defining the manifold channel, a second step extending from the first step, and walls extending from the second step; wherein the first volume is defined between the second step and the second overhang, wherein the second volume is defined between the first step and the first overhang, wherein the connection channel is defined between a transition from the first overhang to the second overhang and a transition between the first step to the second step.

11. The system of claim 10, wherein the valve further comprises:
 a first gasket located within the connection channel that forms a first substantially fluid impermeable seal with the valve member in the closed mode; and
 a second fluid impermeable seal defined between the second overhang and the walls.

12. The system of claim 8, further comprising a timing mechanism fluidly coupling the second volume to an ambient environment.

13. The system of claim 12, wherein the timing mechanism comprises a timing channel having a cross section selected based on a desired leak rate.

14. A tire pressurization system comprising:
 a drive mechanism that provides a pumping force;
 a primary pump comprising a first pump cavity, an actuating element in reciprocal relation with the first pump cavity, and an outlet fluidly connected to a tire;
 a force translator that facilitates pump force transfer from the drive mechanism to the actuating element;
 a pressure regulation mechanism comprising a reciprocating pump, the reciprocating pump comprising: a) a pump chamber comprising an inlet manifold fluidly connected to the tire; b) a valve located within the inlet manifold, the valve having an opening pressure and a closing pressure, the valve operable between: an open mode when a tire pressure exceeds the opening pressure, wherein the valve permits fluid flow from the tire into the pump chamber; and a closed mode when the tire pressure is below the closing pressure, wherein the valve prevents fluid flow from the tire into the pump chamber; and c) a reciprocating element in reciprocal relation with the pump chamber, the reciprocating element operable between: a pressurized position located a first distance from a closed end of the first pump cavity, wherein the reciprocating element ceases force application from the drive mechanism to the actuating element, wherein the reciprocating element is in the pressurized position when the valve is in the open mode; and a depressurized position located a second distance from the closed end of the first pump cavity, the second distance shorter than the first distance, wherein the reciprocating element permits force application to the actuating element, wherein the reciprocating element is in the depressurized position when the valve is in the closed mode.

15. The system of claim 14, wherein the reciprocating element ceases pumping force generation in the pressurized position.

16. The system of claim 15, wherein the pumping force is derived from relative motion between the drive mechanism and the primary pump, wherein a position of the reciprocating pump is statically fixed to a position of the primary pump, wherein the reciprocating element is statically connected to the drive mechanism in the pressurized position is disconnected from the drive mechanism in the depressurized position.

17. The system of claim 16, wherein the reciprocating element comprises a piston.

18. The system of claim 17, wherein drive mechanism comprises a groove, wherein the piston extends into the groove in the pressurized position and is retracted from the groove in the depressurized position.

19. The system of claim 14, wherein the force translator is operable between:
   a pumping position when the reciprocating element is in the depressurized position, wherein the force translator is connected between the actuating element and the drive mechanism; and
   a non-pumping position when the reciprocating element is in the pressurized position, wherein the force translator is disconnected from the drive mechanism, wherein the reciprocating element is connected to the force translator and retains the force translator in the non-pumping position.

20. The system of claim 19, wherein the force translator, pump chamber, and drive mechanism share a common plane when the force translator is in the pumping position.

21. The system of claim 19, wherein the non-pumping position of the force translator is in a second plane separate from the common plane.

22. The system of claim 21, wherein the reciprocating element comprises a piston that applies a decoupling force to the force translator in a direction normal to the common plane to retain the force translator in the non-pumping position.

23. The system of claim 19, wherein the pressure regulation mechanism further comprises a frame statically connecting the reciprocating element and the force translator in fixed relation.

24. The system of claim 23, wherein the drive mechanism comprises:
   a rotational axis;
   a cam comprising an arcuate bearing surface, the cam rotatable about the rotational axis; and
   an eccentric mass coupled to the cam that offsets a center of mass of the drive mechanism from the rotational axis;
wherein the primary pump is rotatably coupled to the rotational axis a radial distance from the rotational axis;
wherein the force translator comprises a roller in non-slip contact with the arcuate bearing surface and in sliding contact with the actuating element when in the pumping position.

25. The system of claim 24, wherein the pump chamber and the reciprocating element share the common plane in the pressurized and depressurized positions.

26. The system of claim 25, wherein the pumping position and non-pumping position are substantially aligned along an actuation axis of the actuating element.

27. The system of claim 26, wherein the primary pump comprises a second reciprocating pump, wherein the pump cavity comprises a second pump chamber and the actuating element comprises a second reciprocating element.

28. The system of claim 27, wherein the first reciprocating element comprises a first reciprocating area and the second reciprocating element comprises a second reciprocating area smaller than the first reciprocating area, wherein the inlet manifold and valve are fluidly connected to the primary pump and permits fluid flow into the primary pump in the open mode.

* * * * *